(12) United States Patent
Fee et al.

(10) Patent No.: US 8,188,718 B2
(45) Date of Patent: *May 29, 2012

(54) METHOD AND APPARATUS FOR A REMOTE BATTERY CHARGER WITH A SELF CONTAINED POWER SOURCE

(75) Inventors: John Arthur Fee, Garland, TX (US); Gary Joseph Tole, Plano, TX (US); William S. Hart, Plano, TX (US); Robert Joseph Miles, Plano, TX (US)

(73) Assignee: Advanced Battery Management, LLC, Irving, TX (US)

( * ) Notice: Subject to any disclaimer, the term of this patent is extended or adjusted under 35 U.S.C. 154(b) by 654 days.

This patent is subject to a terminal disclaimer.

(21) Appl. No.: 11/728,462

(22) Filed: Mar. 26, 2007

(65) Prior Publication Data

US 2007/0170890 A1 Jul. 26, 2007

Related U.S. Application Data

(63) Continuation-in-part of application No. 10/478,815, filed on Nov. 26, 2003, now Pat. No. 7,557,541.

(51) Int. Cl.
*H02J 7/00* (2006.01)
(52) U.S. Cl. ................................. 320/155; 320/139
(58) Field of Classification Search .............. 320/155, 320/145, 139, 100, 103
See application file for complete search history.

(56) References Cited

U.S. PATENT DOCUMENTS

| | | | | |
|---|---|---|---|---|
| 4,883,973 A | * | 11/1989 | Lakey et al. | 290/31 |
| 4,947,124 A | | 8/1990 | Hauser | |
| 5,276,393 A | | 1/1994 | Gali | |
| 5,422,559 A | * | 6/1995 | Hall et al. | 320/139 |
| 5,656,925 A | * | 8/1997 | Schie et al. | 323/222 |
| 5,684,386 A | | 11/1997 | Okada | |
| 5,726,555 A | * | 3/1998 | Takamoro | 320/157 |
| 5,783,929 A | * | 7/1998 | Taricco | 320/139 |
| 5,872,443 A | | 2/1999 | Williamson | |
| 5,891,590 A | | 4/1999 | King | |
| 6,078,166 A | | 6/2000 | Taricco | |
| 6,184,650 B1 | | 2/2001 | Gelbman | |
| 6,229,287 B1 | * | 5/2001 | Ferris et al. | 320/141 |
| 6,743,536 B2 | * | 6/2004 | Fuglevand | 429/9 |

FOREIGN PATENT DOCUMENTS

| | | |
|---|---|---|
| EP | 0 598 470 A2 | 5/1994 |
| WO | WO 93/15543 | 8/1993 |
| WO | WO 98/44613 | 10/1998 |

* cited by examiner

*Primary Examiner* — Edward Tso
*Assistant Examiner* — Samuel Berhanu
(74) *Attorney, Agent, or Firm* — Larkin Hoffman Daly & Lindgren Ltd.; Robert C. Klinger

(57) ABSTRACT

A battery charger with a self-contained power source which provides a current charging signal at or near the resonant frequency of the battery to be charged when no other power supply is readily available. A storage energy device, for example a battery, delivers a current charging signal modulated at or near the resonant frequency of a load, or stores energy from a source.

21 Claims, 5 Drawing Sheets

METHOD AND APPARATUS FOR A REMOTE
BATTERY CHARGER WITH A SELF
CONTAINED POWER SOURCE

CROSS REFERENCE TO RELATED APPLICATIONS

This application is a Continuation-In-Part of patent application Ser. No. 10/478,815 entitled "METHOD AND APPARATUS FOR CHARGING A RECHARGEABLE BATTERY WITH NON-LIQUID ELECTROLYTE", filed Nov. 26, 2003 now U.S. Pat. No. 7,557,541, the teachings of which are incorporated herein by reference.

FIELD OF THE INVENTION

The present invention generally related to battery chargers, and more specifically to remote battery chargers charging at or near the resonant frequency of the battery to be charged.

BACKGROUND OF THE INVENTION

Typically, battery chargers are implemented with a conventional Alternating Current (AC) or Direct Current (DC) connector which is connected to a power source. When a user wants to charge a battery, for example a power tool battery, it is inserted into the charger and the charger draws power from a power source, i.e. an electrical outlet. The prior solutions for battery charging typically require a battery charger connected to an electrical outlet. The problem with electrical outlet solutions, is when there is no readily available power source, the user is left with no options for charging their batteries. What is desired, is a way of charging a plurality of battery types and devices at or near the resonant frequency in order to improve charging efficiency, speed charging time, and extend the lifetime of the battery, while providing a mobile power source in the field.

SUMMARY OF THE INVENTION

The present invention achieves technical advantages as a battery charger with a self-contained power source which provides a current charging signal at or near the resonant frequency of the battery to be charged when no other power supply is readily available. One embodiment of the invention utilizes a storage energy device, for example a battery, which can deliver energy to a load or store energy from a source at or near the resonant frequency.

DETAILED DESCRIPTION OF THE PRESENT INVENTION

Figure 1:
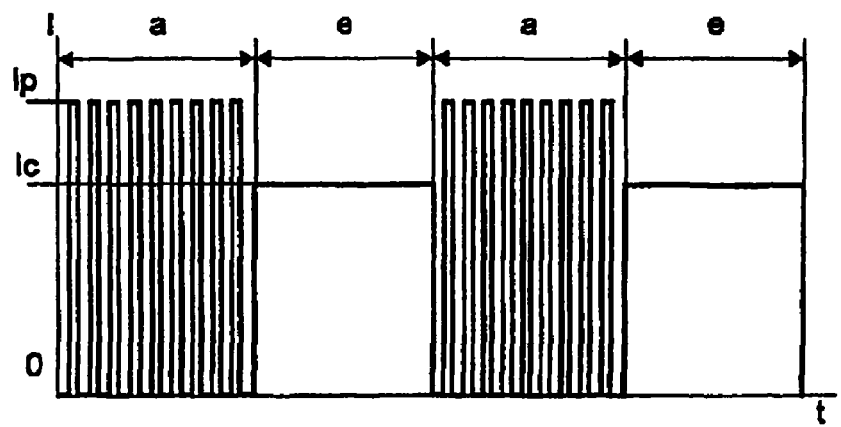
FIG. 1 is a graph depicting the charging current, as a function of time in accordance with the simplest method of the invention.

It is well known that the reduction of the charging time is limited by the slowness of the chemical transformations causing the charging current inside the battery. If in the cells of the rechargeable battery the rate of the chemical transformations can be increased, the charging time can be reduced. Accordingly, the object of the invention is to provide such a charging method, by which the molecular movements in the cells of the rechargeable battery can be accelerated and through this the time necessary for the chemical transformations and the time necessary for the full charge itself can be reduced.

It has been recognized that the intensity of pulsed charging current applied to and taking of by a rechargeable battery is a function of the frequency of the charging pulses, i.e. the impedance of the rechargeable battery varies with the frequency. Varying the charging pulse frequency, a peak charging current vs. frequency of the battery can be found. The peak current frequency varies from battery to battery and depends on their charged state. The method according to the invention and the apparatus implementing the method are based on this recognition.

The object of the invention set before has been attained by means of the method in accordance with invention in such a manner, that the charging process contains at least one charging interval performed with current pulses, the frequency of said current pulses is essentially identical with the internal resonance frequency of the rechargeable battery to be charged. The duty factor of the periodic current pulses is between 1:10 and 10:1 and the peak current of said current pulses is in the range of 1•C5 and 10•C5. The duration of the interval of periodic current pulses ranges between 200 ms and 1500 ms, where the frequency of the periodic current pulses is within the range of 1 Hz to 2 MHz.

The advantage of this method consists in the fact, that when charging with pulses at the resonance frequency of the rechargeable battery the multiple of the usual charging current may be applied without a significant heat dissipation and damaging the battery, meanwhile an intensive internal molecular movement can be achieved in the cells, which results in a significant acceleration of the chemical transformation and of the charging of the battery.

According to a preferred embodiment of the method according to the invention, following the charging interval consisting of periodic current pulses, the charging is performed in an interval of a continuous DC charging current, the duration of which is ranging between 200 ms and 1500 ms. Then a charging interval with periodic current pulses is applied again. The interval consists of said continuous charging current is performed within a current intensity range of 1•C5 and 10•C5.

The advantage of this embodiment is that during the charging with current pulses, the battery is substantially prepared to accept the intensive charging, then an intensive charging can be adapted with the continuous charging current or a varying charging current.

In a further preferred embodiment of the method according to the invention between the charging interval with continuous current and the subsequent charging interval with periodic current pulses a first relaxation interval is inserted, in which no charging current is applied to the rechargeable battery. The duration of the first relaxation interval is not more than 1500 ms.

The advantage of this alternative embodiment is that during the first relaxation interval the chemical transformations will be further enhanced, then the following charging with periodic current pulses will efficiently effectuate again the molecular movements in the cells.

Within the first relaxation interval a first discharging interval is applied, the duration of which is not more than 50 ms. This discharging interval influences advantageously the charge taking of capability of the rechargeable battery.

According to a further preferred embodiment, between the charging interval consists of periodic current pulses and the subsequently applied interval consists of continuous current a second relaxation interval is inserted, in which no charging current is applied to the rechargeable battery, the duration of the second relaxation interval is not more than 1500 ms. Within the second relaxation period a second discharging interval is applied, the duration of which is not more than 50 ms.

In the apparatus implementing the method according to the invention, the battery to be charged has an internal resonance frequency and through a current metering device a power supply is connected to the terminals of the rechargeable battery. In accordance with the invention, in addition to the current metering device between one of the battery terminals and the power supply a controlled current generator is inserted, to the control input of which a control signal is applied by means of a control circuit, the intensity of the charging current applied through the current generator to the terminal of the rechargeable battery is controlled by means of said control signal.

According to a preferred embodiment of the apparatus according to the invention, the control circuit provides a square pulse having a frequency corresponding to the internal resonance frequency of the rechargeable battery, said square pulse is applied to the control input of the controlled current generator, said current generator interrupts the charging current during the square pulse spaces and during the pulses controls the charging current flowing through the current generator to a value between 1•C5 and 10•C5. The duty factor of the square pulse having a frequency corresponding to the internal resonance frequency of the battery to be charged is in the range of 1:10 and 10:1.

According to another preferred embodiment the output of the current metering device is connected to the control unit, on basis of the feedback signal provided by the current metering device the control unit controls the intensity of the charging current by means of the current generator.

The current metering device is implemented by means of a Hall-generator or simply by means of a resistor, the output signal of which appears on the ends of the resistor.

To implement the discharge interval according to the invention parallel to the terminals of the rechargeable battery to be charged at least one discharging circuit is connected, which could consist of a series arrangement of a resistor and a controlled switch. Accordingly, to the control input of said controlled switch an output of the control unit delivering a pulse corresponding to the discharging interval is connected.

The controlled switch is implemented with a known, fast operating, preferably semiconductor device, for example by means of a FET.

The charging of the rechargeable battery adapting the method according to the present invention may be continued till its fully charged state. The statement, sensing, displaying of the charged state are not objects of this invention, for this purpose several other solutions are well known.

The method according to the invention, as well as the apparatus for the implementation of the method is now explained in details below and reference is made to the exemplary embodiment, shown on the accompanying drawings.

The first and simplest possible preferred method according to the invention can be followed in FIG. 1. On the horizontal axis of the graph the time t, on the vertical axis the current I applied to the terminals of the rechargeable battery are drawn up. The charging current is supplied by an electric power supply applied through a charging circuit to the terminals of the battery to be charged, which the power supply can be a rectifier connected to the AC power line voltage, but any power source with higher or similar voltage may be used as well. With this embodiment there are different charging intervals inserted into the charging current, namely interval a, which is a pulsed charging interval, followed by an interval e, which is a charging interval with continuous charging current.

The interval a is a charging interval consisting of charging current pulses. The frequency of the pulse series is essentially identical with the internal resonance frequency of the rechargeable battery. This resonance frequency lies, in practice, in the range of 1 Hz to 2 MHz. The duty factor of the pulses, that is the signal/pause ratio may be chosen in the range of 1:10 to 10:1. The duration of the interval a is preferably within the range of 200 ms and 1500 ms. Within this range the more exact duration has to be determined experimentally in compliance with the type of the rechargeable battery.

In interval a the intensity of the Ip current pulses is advantageously in the range of 1•C5 and 10•C5, the value of which has to be determined also experimentally in compliance with the type of the respective rechargeable battery.

In interval a the rechargeable battery takes up a relatively smaller charge, the pulse series of this interval substantially prepares the cells of the rechargeable battery for taking up the charge. The interval a is followed by an interval e, the duration of which is preferably between 200 ms and 1500 ms, the optimal duration of this interval has to be determined experimentally also in compliance with the type of the rechargeable battery. Within interval e the value of the charging current pulse Ic is constant and its value is advantageously in the range of 1•C5 and 10•C5.

The optimal current pulse Ip within the interval a, the charging current Ic within the interval e, as well as the duration of interval a and the duration of interval e can be considered constant. These values do not vary for rechargeable batteries of a given type.

As can be seen in FIG. 1, the section consisting of the above mentioned interval a and interval e repeats, that is after an interval e follows again an interval a, then follows an interval e. This process can be periodically repeated till the complete charging of the rechargeable battery is attained.

Figure 2:
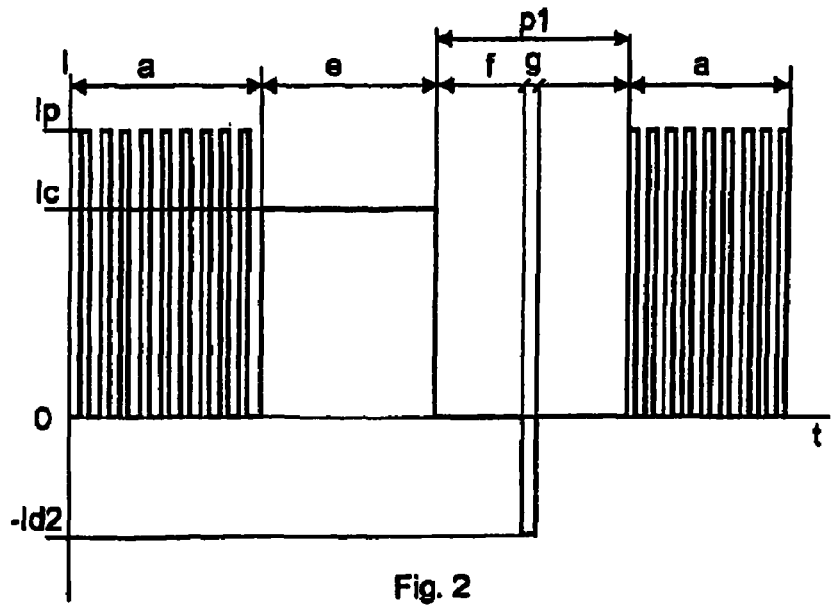
FIG. 2 is a graph depicting the charging current, as a function of time in accordance with a second preferred method of the invention.

In FIG. 2, a variation is illustrated for the charging method of the rechargeable battery, where the period consisting of the interval a and interval e is followed by a relaxation interval p1, during which no charging current is applied. During this relaxation interval p1 the internal chemical transformation of the rechargeable battery promotes the more effective charge uptake. The duration of the relaxation interval p1 may be substantially very short, preferably at most 1500 ms, the optimal duration of this interval has to be determined experimentally also in compliance with the type of the rechargeable battery. Following the relaxation interval p1 follows again an interval a consisting of periodic current pulse series. The sequence of intervals a, e and p1 repeats periodically. This process can be repeated till the complete charging of the rechargeable battery attained.

The charge take-up capacity of the rechargeable battery can be increased, when during the relaxation interval p1 a short discharge interval g is inserted, the duration of which is at most 50 ms. This discharge interval g is applied with at most 700 ms delay after the interval e. The discharge is performed with a limited −Id1 current, the intensity of which is at most 10•C5.

Figure 3:
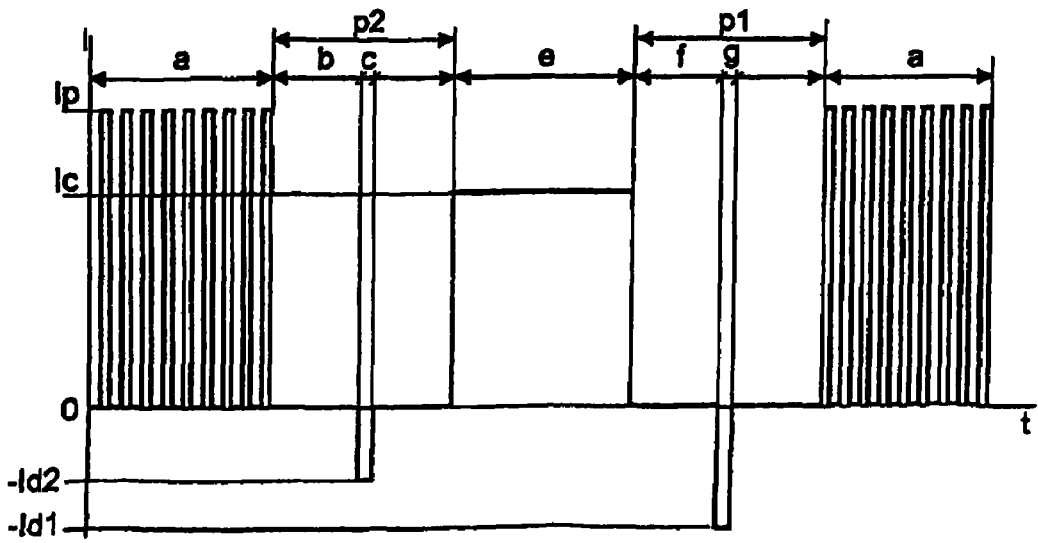
FIG. 3 is a graph depicting the charging current, as a function of time in accordance with a third preferred method of the invention.

In FIG. 3 a further preferred embodiment of the method according to the invention is shown, which differs from the method shown in FIG. 2 in that, between the interval a consists of current pulse series and the continuous charging current interval e a second relaxation interval p2 is inserted. The duration of the relaxation interval p2 can be optionally short, as like as the said relaxation interval p1, but their duration are not necessarily the same. The maximal duration of the relaxation interval p2 is 1500 ms. Within the second relaxation interval p2 a second discharge interval c is inserted, the duration of which is at most 50 ms. This discharge interval c is applied with at most 700 ms delay after the interval a consisting current pulse series. The discharge is performed with a limited −Id2 current, the intensity of which is at most 10•C5.

The method disclosed in connection with the before mentioned examples not necessarily has to be applied in the full charging time of the rechargeable battery. The charging time can be effectively reduced even if the continuous charging current of the rechargeable battery is interrupted by an interval a consisting of current pulse series or by the intervals a to h or p1, p2 shown in FIGS. 1 to 3 respectively.

The continuous charging can be desirable at the beginning of the charging process in such cases, if a rechargeable battery is completely or deeply discharged. With such batteries there may be no resonance phenomenon. In such cases the rechargeable battery is to be charged by continuous charging at least to such a charge level, where the internal resonance of the rechargeable battery can be detected and from this level the method shown in FIGS. 1 to 3 can be effectively applied. However, rechargeable batteries in continuous use, are usually not discharged to such a deep level.

Figure 4:
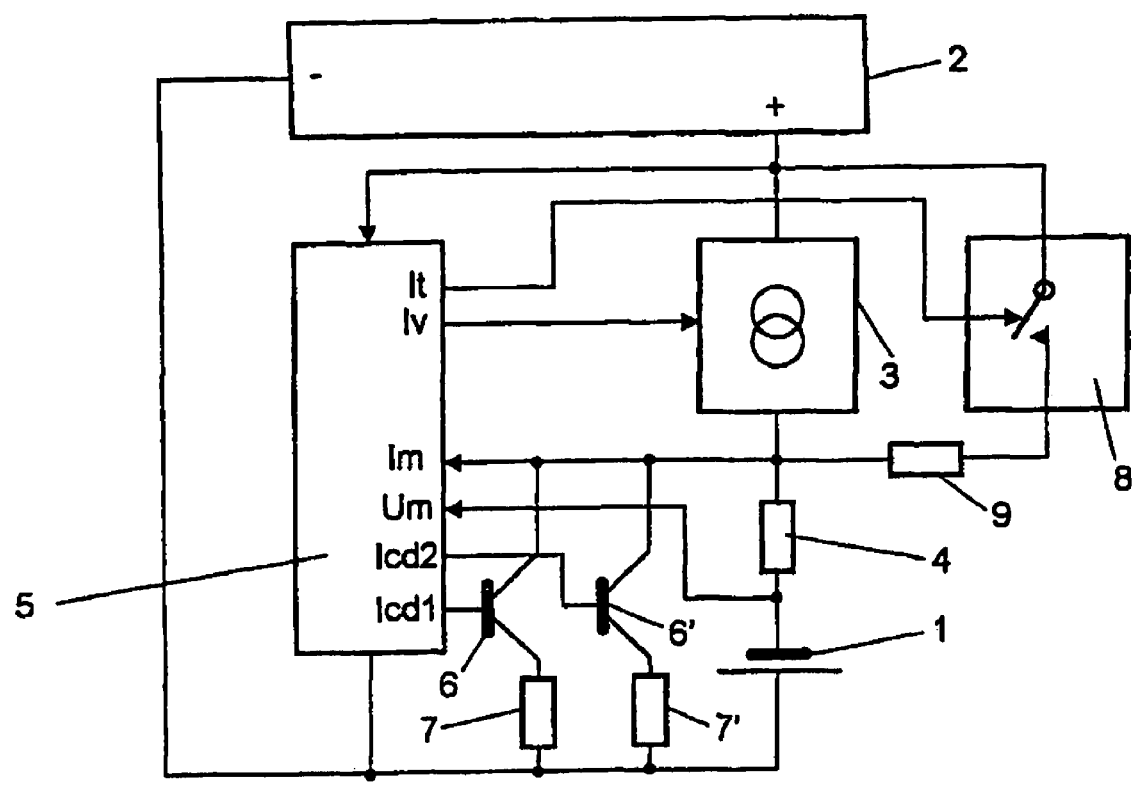
FIG. 4 is the schematic circuit diagram of an apparatus for the implementation of the method in accordance with the invention.

The circuit diagram of a battery charger apparatus according to the invention implementing the method according to the invention is shown in FIG. 4. The charging current applied to the rechargeable battery 1 is supplied by an electric power supply 2 or another rechargeable battery with higher or similar voltage through a controlled current generator 3. Between the current generator 3 and the rechargeable battery 1 a current metering device 4 is inserted. Parallel to the terminals of the rechargeable battery 1 a controlled loading unit is connected, which consists of the series arrangement of a resistor 7 and a controlled switch 6, the latter is preferably a semiconductor switching device, for example a FET or a transistor or any other, fast operating controlled switching element. The control input of the controlled switch 6 is connected to the output Icd1 of the control circuit 5;

The method according to FIGS. 1 to 3 is implemented by a control circuit 5, for example by means of a programmable function generator. Accordingly, the control output Iv of the control unit 5 is connected to the control input of the current generator 3. During the charging interval a consisting of periodic current pulse series the said control output Iv provides a modulated charging signal having a frequency substantially identical with the internal resonance frequency of the rechargeable battery 1 to be charged, the amplitude of which is proportional with the intensity of the pulse Ip. In one exemplary embodiment, the charging signal is a square pulse.

The square pulse opens the current generator 3 during the pulse and applies current pulses Ip to the rechargeable battery 1, the amplitude of which square pulses is proportional to the charging current pulses Ip applied through the current metering unit 4. Although the charging signal is described as a square pulse, the charging signal can have any waveform.

In accordance with the preferred embodiment of the invention shown in FIG. 4 the positive terminal of the rechargeable battery 1 is connected to the voltage metering input Um of the control unit 5. The output of the current metering device 4 is connected to the current metering input Im of the control circuit 5.

The current metering device 4 can be any known current meter, such as a known Hall-generator, but a simple resistor, schematically shown in FIG. 4 can be utilized too, on the ends of which a voltage appears proportional to the charging current flowing into the rechargeable battery 1, but any other known current metering element can be utilized for this purpose. The voltage on the current metering resistor shown in the example and illustrated in FIG. 4 applied to the voltage measuring input Um and the current measuring input Im of the control unit 5. By this voltage the control unit 5 controls the amplitude of the square pulse appearing on the control output Iv.

The frequency of the square pulses appearing on the control output Iv can be set on the function generator of the control unit or—if the battery charger is utilized to a given type or manufacturer of rechargeable battery—it is set to a determined frequency. According to the experiences the duty factor of the square pulses may vary within the range of 1:10 and 10:1, which can be determined more precisely experimentally in compliance with the type of the rechargeable battery.

The function generator of the control unit 5 provides the interval e in a similar manner, as well as the relaxation interval p1 or the relaxation interval p2, shown in FIG. 3. During the interval e appears a continuous signal at the output Iv, whereas during the relaxation intervals p1 and p2 the current generator 3 is in closed state, does not forward any charging current.

In the course of the method according to the invention, during the relaxation intervals p1 and p2 the optionally applicable discharging intervals c and g respectively are implemented by means of a serial discharge or loading circuit consisting of a resistor 7 and a controlled switch 6. For this purpose the control unit 5 supplies through its output Icd1 a pulse to the control input of the controlled switch 6 produced preferably by the function generator mentioned above, the duration of said pulses corresponds to the duration of intervals c and g, respectively. On effect of said pulse the switch 6 closes and a discharge current determined by the resistor 7 and the voltage of the battery 1 loads the rechargeable battery 1 for the duration of the pulse.

In the case when in the relaxation intervals p1 and p2 the −Id1 and −Id2 discharging currents in the intervals c and g are different, a further loading circuit will be connected parallel to the terminals of the rechargeable battery 1 consisting of a controlled switch 6' and a resistor 7'. The input of the controlled switch 6' is connected to the output Icd2 of the control unit 5. The loading circuits consisting of two different resistors 7 and 7' loading with different discharge currents −Id1 and −Id2 the rechargeable battery 1.

The control unit 5 may be completed in such a manner, that preceding the charging a test can be performed on the rechargeable battery 1. The test results can be stored and the charging can be performed on basis of the stored data. For example, in a preliminary testing period the function generator of the control unit 5 provides a square pulse having a continuously varying wobbulating frequency between 1 Hz and 2 MHz, the amplitude of which is significantly lower than that of the square pulse used during the charging, for example has a value of 0,1-C5. For this reason between the power supply 2 and the current metering device 4 a series arrangement of a controlled switch 8 and of a resistor 9 is included, as shown in FIG. 4. The control input of the controlled switch 8 is connected to an output It of the control unit 5.

For testing purposes a low measuring current pulse series has to be applied, with which it can be ensured, that when varying the frequency the measuring charging current applied to the rechargeable battery does not reach the saturation current even at the resonance frequency. This current can be set by means of the resistor 9.

The voltage proportional with the test charging current having a wobbulating frequency measured by the current metering device 4 appearing between the voltage metering input Um and the current metering input Im is proportional with the internal resistance of the tested rechargeable battery at the instantaneous frequency of the square pulse. This measuring charging current pulse series has a peak value in function of the pulse frequency, which is the resonance frequency of the tested rechargeable battery.

Of course the current generator 3, the switch 8 and the resistor 9 can be integrated in a single circuit as well, with which both the testing and the charging of the rechargeable battery can be performed.

The method according to the invention is intended for use in the charging of rechargeable batteries with non-liquid electrolyte, such as Li-ion, NiCd, NiMH and lead batteries with gel electrolyte (SLA).

Figure 5:
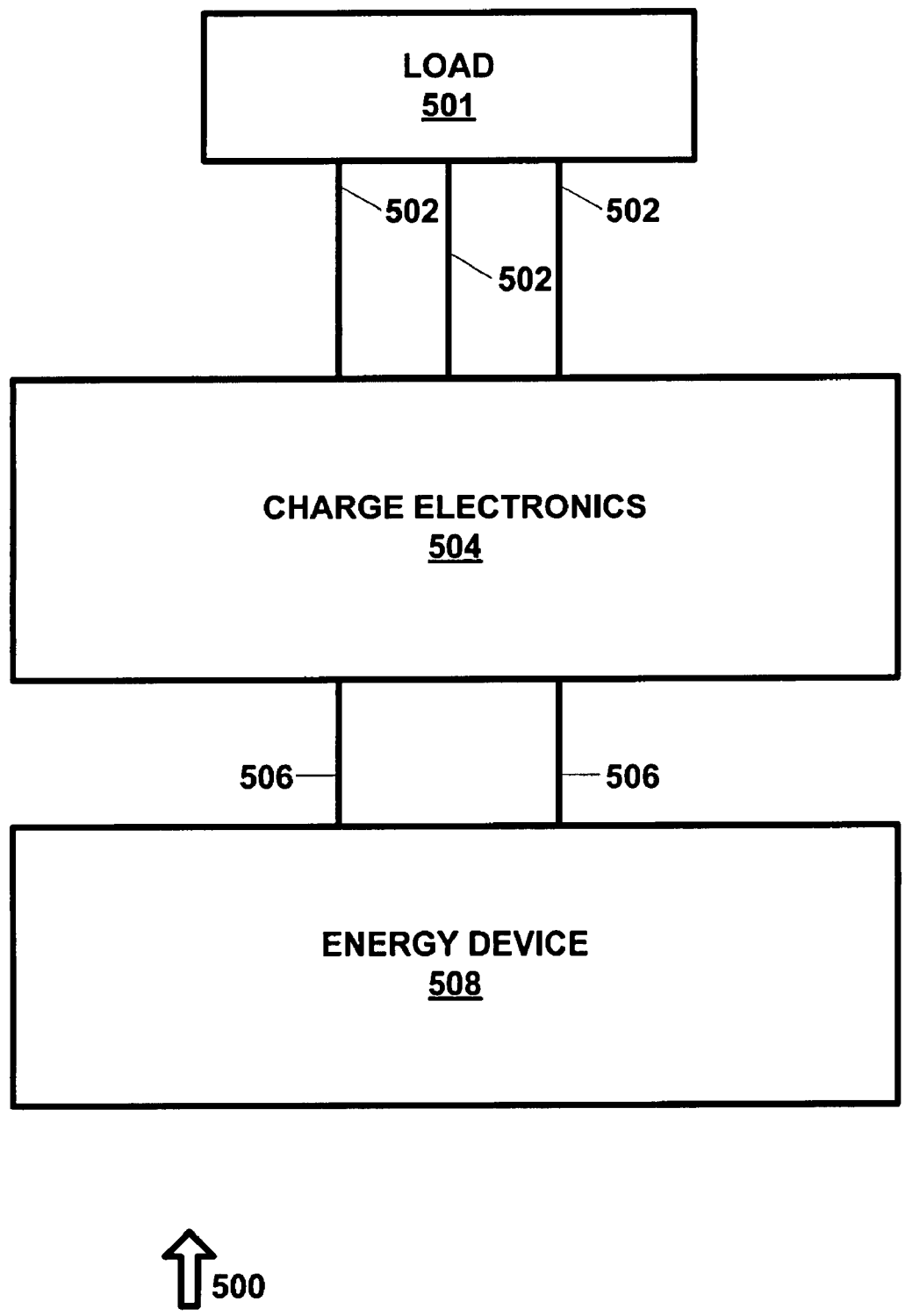
FIG. 5 is a diagram of one exemplary embodiment of the present invention.

Referring to FIG. 5, there is shown at 500 a diagram of one exemplary embodiment of the present invention. A first end of a plurality of charging terminals 502 is operably coupled to a load 501, which allows for both charging and identification. A second end of a plurality of charging terminals 502 is operably coupled to charge electronics 504. The charge electronics 504 generate and process a modulated charging signal at or near a resonant frequency of the load. A mobile energy device 508, such as a direct-current energy source, is operably coupled to the charge electronics 504. The mobile energy device 508 is adapted to store energy and deliver the energy, processed through the charge electronics 504, to a load in a plurality of locations without a readily-available power source. A plurality of wires 506 are used to operably couple the charge electronics 504 to a mobile energy device 508. The mobile energy device 508 may be any type of device that stores and delivers energy, such as, but not limited to, a non-corded Alternating Current (AC) or Direct Current (DC) energy source, a primary or secondary battery, a fuel cell, an ultra capacitor, or a butane energy generator, or any combination thereof.

Figure 6:
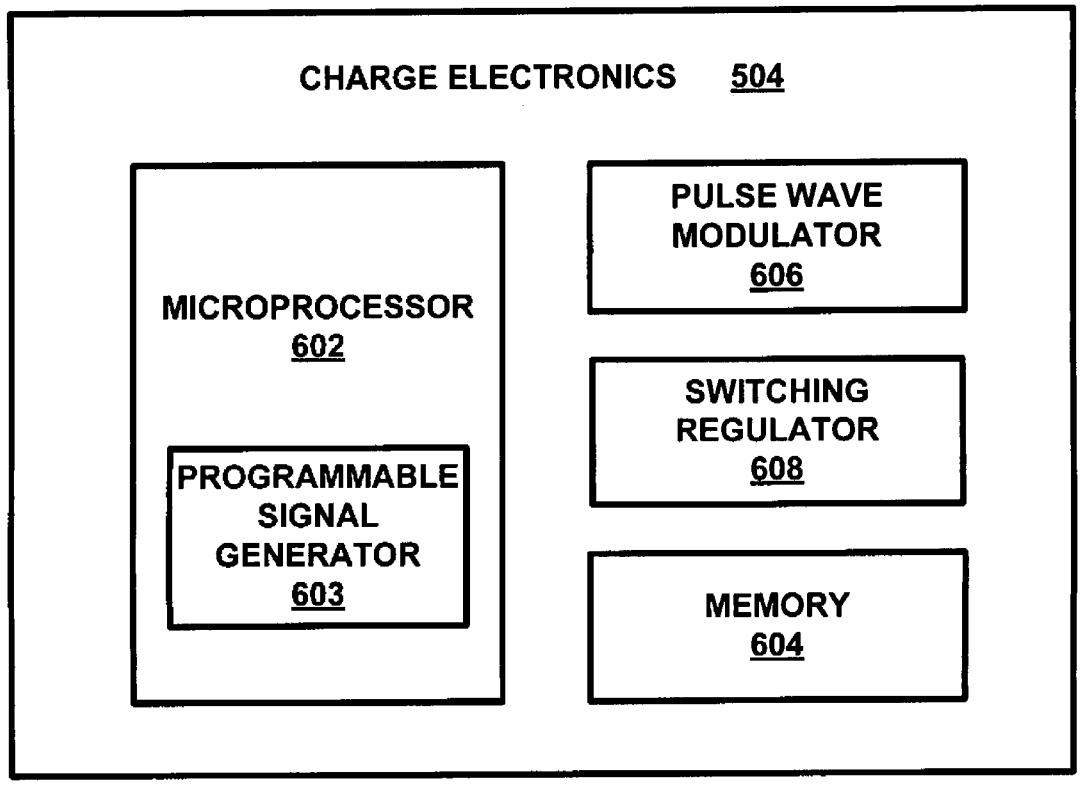
FIG. 6 is a diagram of charge electronics in accordance with an exemplary embodiment of the present invention.

Referring to FIG. 6, there is shown at 600 a block diagram of the components comprising the charge electronics 504 in accordance with an exemplary embodiment of the present invention. A Class D Pulse Wave Modulator (PWM) 606, generates a modulated charging signal from a current generator 610 to yield a voltage between zero to 30 volts DC and a current between zero to 11 amps DC. A switching regulator 608 transforms the voltage from the mobile energy device 508 from 12 volts or 24 volts DC to 30 volts DC for use with the PWM 606. After the microprocessor 602 determines battery manufacturer, the charging parameters for the load are read from a memory 604 storing a plurality of charging parameters and loaded into a programmable signal generator 603 located on-board the microprocessor 602 and the load is modulated accordingly.

In one exemplary embodiment, the current generator 610 modulation is selected from a library of waveform algorithms located in a memory 604 including: sine, square, sawtooth, trapezoidal, rectangle, etc, and the algorithm is loaded into the microprocessor 602 to generate a modulated charging signal.

In a second exemplary embodiment, the Class D PWM 606 power supply is used as the current source, which is modulated by the programmable signal generator 603 on the microprocessor 602. Modulated signals of any waveform can be used to charge the battery as long as the modulation frequency is at or near the resonant frequency of the load, or at or near any harmonic or harmonics of the resonant frequency of the load.

In a third exemplary embodiment, a rechargeable battery load is placed in the remote charger for charging. The charger's terminals are operably coupled to the rechargeable battery's terminals in order to charge the rechargeable battery and to read a 4-bit word which identifies the battery's manufacturer. The characteristics are determined by correlating the battery under charge's manufacturer with a list of battery manufacturers found in a look up table resident in the charger memory. If a manufacturer cannot be determined, default charging parameters will be used for battery charging, or the rechargeable battery can be analyzed to determine chemistry and other pertinent parameters. Each battery type has associated charging parameters best suited to charge every battery type. The predetermined charging parameters associated with the manufacturer will be used for battery charging. The look up table parameters include: delivery current, delivery voltage, and modulation waveform.

Figure 7:
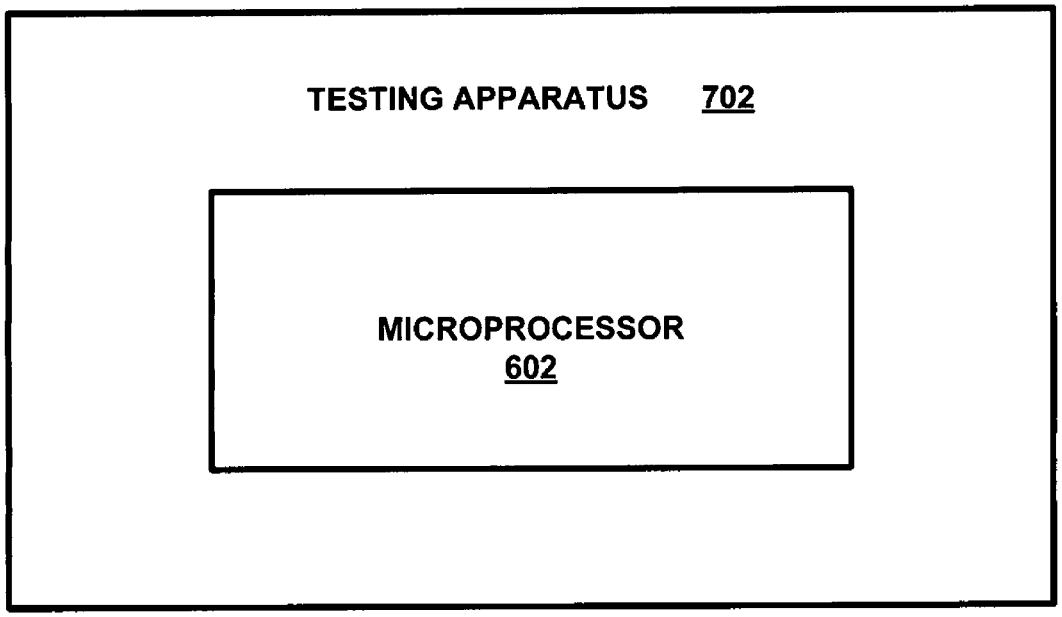
FIG. 7 is a diagram of a resonant frequency testing apparatus in accordance with an exemplary embodiment of the present invention.

One method employed in charging the rechargeable battery uses "Group Battery Resonance" in which the resonant frequency of several manufacturer's batteries with common characteristics or parameters are measured by a testing apparatus 700 shown in FIG. 7, which resonant frequencies are averaged to determine a group resonance, which is nearly equivalent to each individual battery's resonance, but will work well with all batteries of the group. Within a battery manufacturer's production, variances occur in manufacturing tolerances. From statistical averaging, the group resonance is determined. If several different manufacturers batteries are measured and groups of these batteries exhibit near the same resonance, each group can be charged with a charging signal modulated at the respective group resonance. In some cases, the group resonance signal frequency may be constant through the entire charge; in other cases the resonance may change as a function of State Of Charge (SOC), if the change in battery group resonance as a function of SOC is known. In addition, batteries are usually grouped by size and batteries that exhibit similar properties within that size, the charger can apply similar charging logic i.e. group resonance to that battery size. This allows the charger to apply common charging logic either to battery size or group resonance for batteries with similar characteristics.

The present invention achieves technical advantages because other solutions do not charge a battery at or near its resonant frequency. Charging signals may be modulated for such ancillary purposes as decalcifying a battery, but even these signals are not modulated at the resonant frequency of the battery under charge. Charging a battery with a modulated current source at or near the resonant frequency of the battery under charge, or one of the associated harmonics, provides efficient energy transfer into the battery.

Though the invention has been described with respect to a specific preferred embodiment, many variations and modifications will become apparent to those skilled in the art upon reading the present application. It is therefore the intention that the appended claims be interpreted as broadly as possible in view of the prior art to include all such variations and modifications.

What is claimed is:

1. An apparatus for charging a battery, comprising:
   a mobile energy device configured to store energy and deliver the energy to the battery as a function of a modulated current charging pulse without using a readily-available power source; and
   a current source configured to generate no voltage and configured to generate the modulated current charging pulse at a resonant frequency of the battery as a function of a charging parameter, the modulated current charging pulse being delivered to the battery and configured to enhance cell mobility of the battery regardless of a voltage of the battery and enhance acceptance of the current charging pulse such that the battery has an improved charging time.

2. The apparatus of claim 1, further comprising a memory configured to store the charging parameter.

3. The apparatus of claim 2, wherein the charging parameter is an algorithm.

4. The apparatus of claim 3, wherein the algorithm is configured to generate a plurality of waveforms of the modulated current charging pulse.

5. The apparatus of claim 2, wherein the memory is configured to store charging current values.

6. The apparatus of claim 2, wherein the memory is configured to store charging voltage values.

7. The apparatus of claim 1, wherein the mobile energy device is a rechargeable battery.

8. The apparatus of claim 1, wherein the mobile energy device is a non-corded energy source.

9. The apparatus of claim 1, wherein the mobile energy device is a fuel cell.

10. The apparatus of claim 1, wherein the mobile energy device is an ultra-capacitor.

11. The apparatus of claim 1, wherein the mobile energy device is a butane energy generator.

12. The apparatus of claim 1, wherein the current source contain a PWM.

13. The apparatus of claim 1, wherein the battery is a rechargeable battery of a device.

14. An apparatus for charging a battery, comprising:
   a mobile energy device configured to store energy and deliver the energy to the battery as a function of a modulated current charging pulse without using a readily-available power source; and
   a current source configured to generate no voltage and the modulated current charging pulse at a harmonic of a resonant frequency of the battery as a function of a charging parameter, the modulated current charging pulse being delivered to the battery and configured to enhance cell mobility of the battery regardless of a voltage of the battery and enhance acceptance of the current charging pulse such that the battery has an improved charging time.

15. The apparatus of claim 14, further comprising a memory configured to store the charging parameter.

16. The apparatus of claim 14, wherein the battery is a rechargeable battery of a device.

17. The apparatus of claim 1, wherein the energy device is an ultra-capacitor.

18. The apparatus as specified in claim 1, further comprising a controller configured to provide a control signal to the current source, the current source configured to apply the modulated current charging pulse as a function of the control signal.

19. The apparatus as specified in claim 1 wherein the current source is configured to generate the modulated current charging pulse at the resonant frequency of the battery during a first charging interval, generate a constant current charging signal during a subsequent second charging interval, and then modulated current charging pulse at the resonant frequency of the battery during a third charging interval.

20. The apparatus a specified in claim 19 further comprising a controller configured to provide a control signal to the current source, the current source configured to apply the modulated current charging pulse as a function of the control signal during the first charging interval, the second charging interval, and the third charging interval.

21. The apparatus as specified in claim 20 wherein the control signal comprises a pulse train of pulses having a frequency corresponding to the resonant frequency of the batter during the first charging interval and the third charging interval.

* * * * *